US008858396B2

(12) United States Patent
Gwon et al.

(10) Patent No.: US 8,858,396 B2
(45) Date of Patent: Oct. 14, 2014

(54) DEVICE AND METHOD FOR CONTROLLING ISG LOGIC

(75) Inventors: Chongah Gwon, Hwaseong-si (KR); Sejun Kim, Seoul (KR); Jiyong Yu, Pocheon-si (KR); Junghwan Bang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 407 days.

(21) Appl. No.: 13/276,917

(22) Filed: Oct. 19, 2011

(65) Prior Publication Data
US 2012/0142492 A1 Jun. 7, 2012

(30) Foreign Application Priority Data

Dec. 7, 2010 (KR) ........................ 10-2010-0124551

(51) Int. Cl.
| | |
|---|---|
| B60W 10/18 | (2012.01) |
| F02N 11/08 | (2006.01) |
| B60W 10/06 | (2006.01) |
| B60W 30/18 | (2012.01) |
| B60W 10/10 | (2012.01) |
| F16H 61/00 | (2006.01) |

(52) U.S. Cl.
CPC ....... *B60W 10/06* (2013.01); B60W 2510/1005 (2013.01); B60W 2710/0644 (2013.01); B60W 2540/12 (2013.01); F02N 2200/102 (2013.01); Y02T 10/48 (2013.01); F02N 2200/0802 (2013.01); *F02N 11/0837* (2013.01); F16H 61/0031 (2013.01); B60W 2710/182 (2013.01); F02N 2200/124 (2013.01); *B60W 30/18018* (2013.01); *F02N 11/0822* (2013.01); *B60W 10/10* (2013.01)

USPC .......................................... 477/185

(58) Field of Classification Search
CPC ................ B60W 10/06; B60W 10/18; B60W 30/18018; B60W 2540/12
See application file for complete search history.

(56) References Cited

U.S. PATENT DOCUMENTS

| | | |
|---|---|---|
| 5,052,531 A | 10/1991 | Bota |
| 6,275,759 B1 | 8/2001 | Nakajima et al. |
| 2004/0231951 A1 | 11/2004 | Hasegawa et al. |
| 2004/0262995 A1 | 12/2004 | Hawkins |

(Continued)

FOREIGN PATENT DOCUMENTS

| | | |
|---|---|---|
| JP | 2000-179389 A | 6/2000 |
| JP | 2000-274273 A | 10/2000 |

(Continued)

*Primary Examiner* — Robert A Siconolfi
*Assistant Examiner* — Huan Le
(74) *Attorney, Agent, or Firm* — Morgan, Lewis & Bockius LLP

(57) ABSTRACT

A device controls ISG (Idle Stop & Go) logic mounted in a vehicle equipped with an ISG system. The device includes a transmitting unit that shows the current state of a gear in the vehicle and controls the hydraulic pressure of a transmission in idle stop or restarting an engine, a driving unit that performs the idle stop when the pedal of a brake becomes ON, with the gear at a D (Drive)-range, and restarts the engine when the pedal of the brake becomes OFF, with the gear of the vehicle at the D-range, and a brake unit that controls movement of the vehicle by controlling the hydraulic pressure of the brake, in which brake unit controls the hydraulic pressure of a brake to be kept for a predetermined time from when the pedal of the brake becomes OFF.

11 Claims, 8 Drawing Sheets

(56) References Cited

U.S. PATENT DOCUMENTS

| | | |
|---|---|---|
| 2005/0140208 A1 | 6/2005 | Ji |
| 2008/0125944 A1 | 5/2008 | Kamishima et al. |
| 2010/0174460 A1 * | 7/2010 | Gibson et al. .................. 701/54 |
| 2011/0082624 A1 | 4/2011 | Yamamoto |
| 2011/0218699 A1 | 9/2011 | Petzold |

FOREIGN PATENT DOCUMENTS

| | | |
|---|---|---|
| JP | 2001-3778 A | 1/2001 |
| JP | 2001-163087 A | 6/2001 |
| JP | 2003-148309 A | 5/2003 |
| JP | 2003-260960 A | 9/2003 |
| JP | 2004-308579 A | 11/2004 |
| JP | 2005-186928 A | 7/2005 |
| JP | 2006-112322 A | 4/2006 |
| JP | 2006-170150 A | 6/2006 |
| JP | 2006-170290 A | 6/2006 |
| JP | 2008-185022 A | 8/2008 |
| JP | 2008-215293 A | 9/2008 |
| JP | 2009-167889 A | 7/2009 |
| JP | 2010-77904 A | 4/2010 |
| JP | 2010-84841 A | 4/2010 |
| KR | 2000-0004073 U | 2/2000 |
| KR | 2002-0008408 A | 1/2002 |
| KR | 10-0897040 B1 | 5/2009 |
| KR | 10-2009-0108422 A | 10/2009 |
| KR | 10-2010-0050786 A | 5/2010 |
| KR | 10-2010-0065885 A | 6/2010 |

* cited by examiner

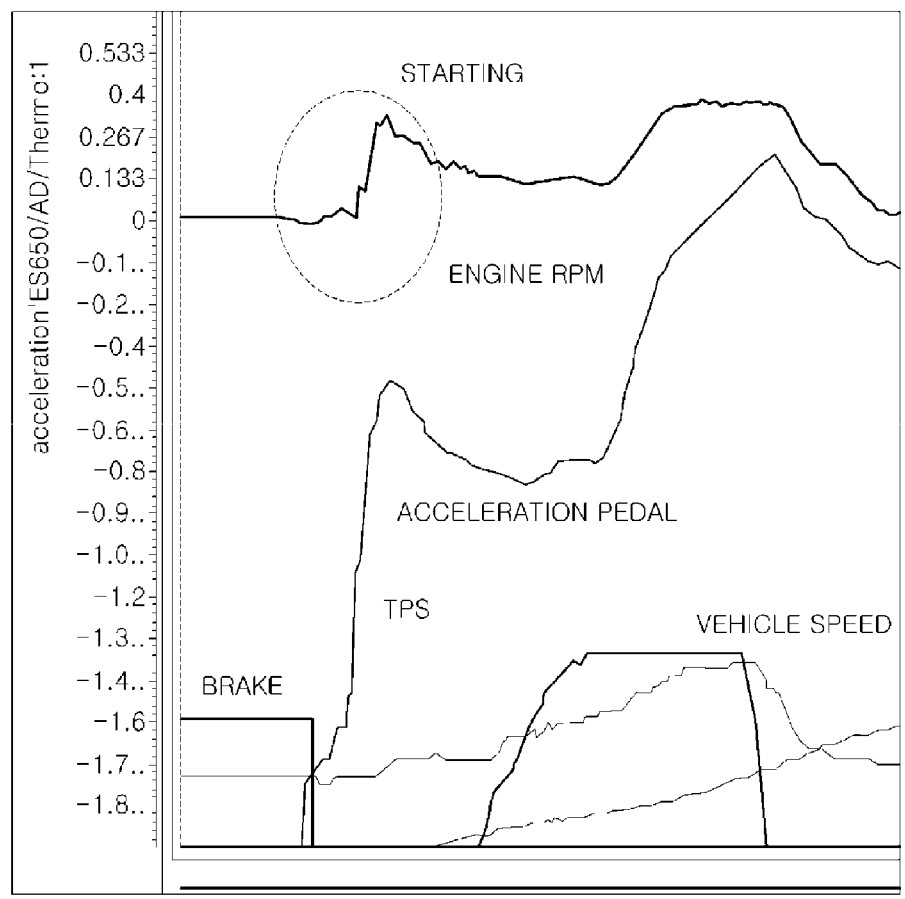

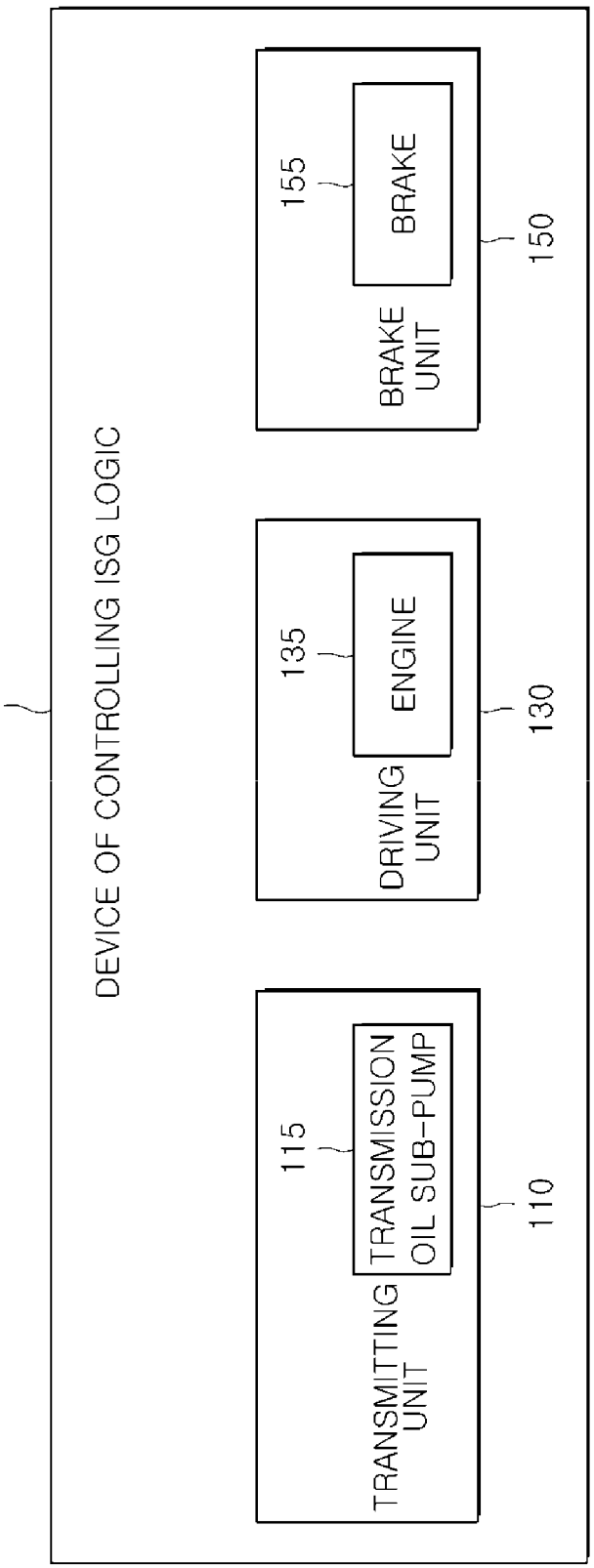

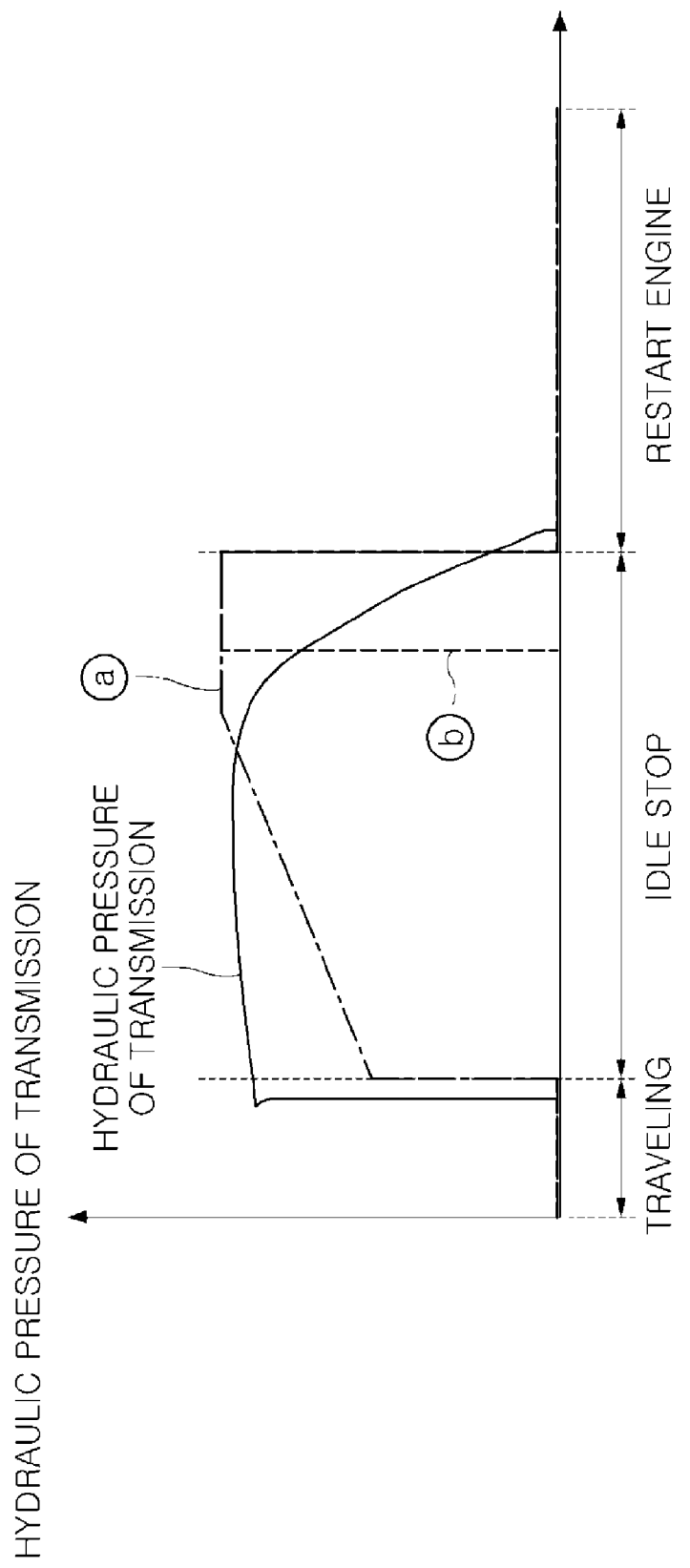

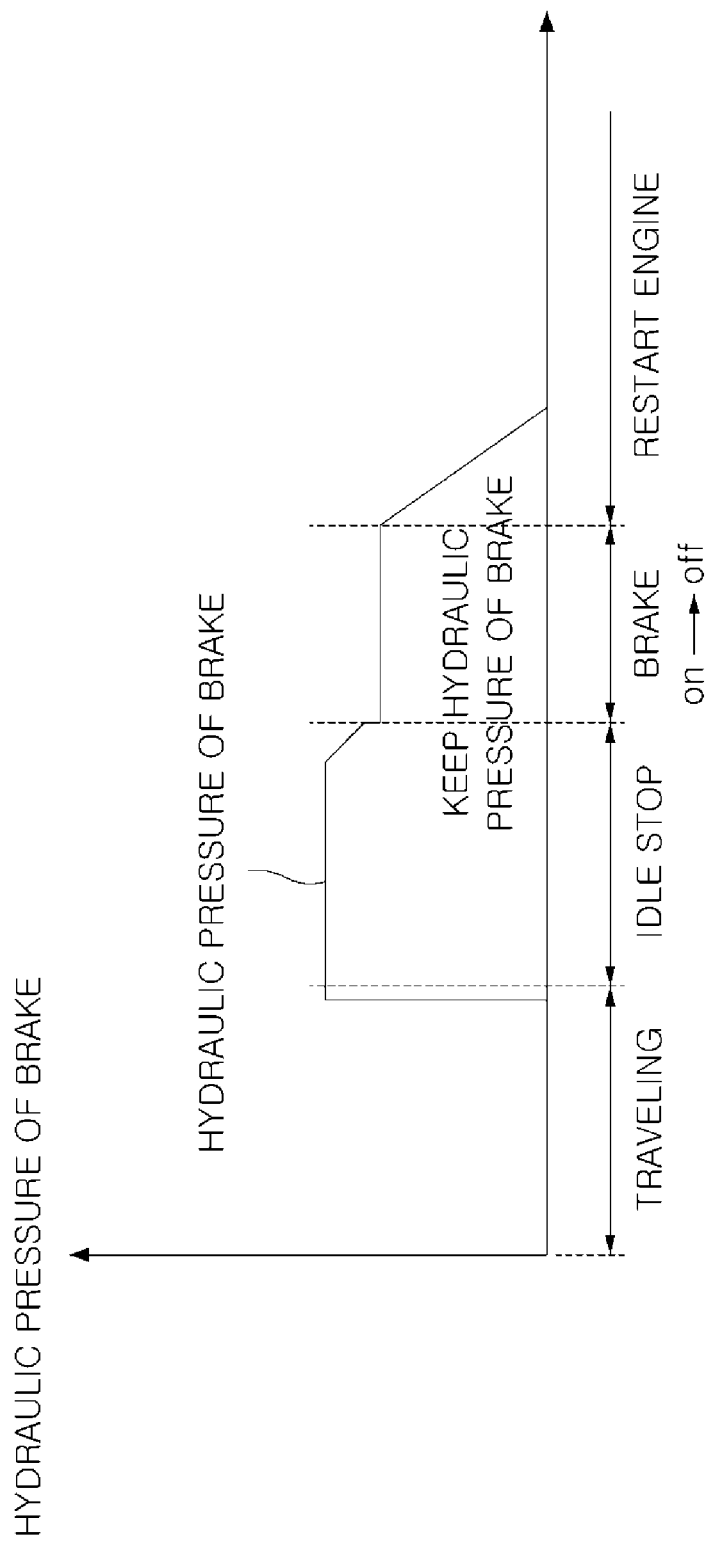

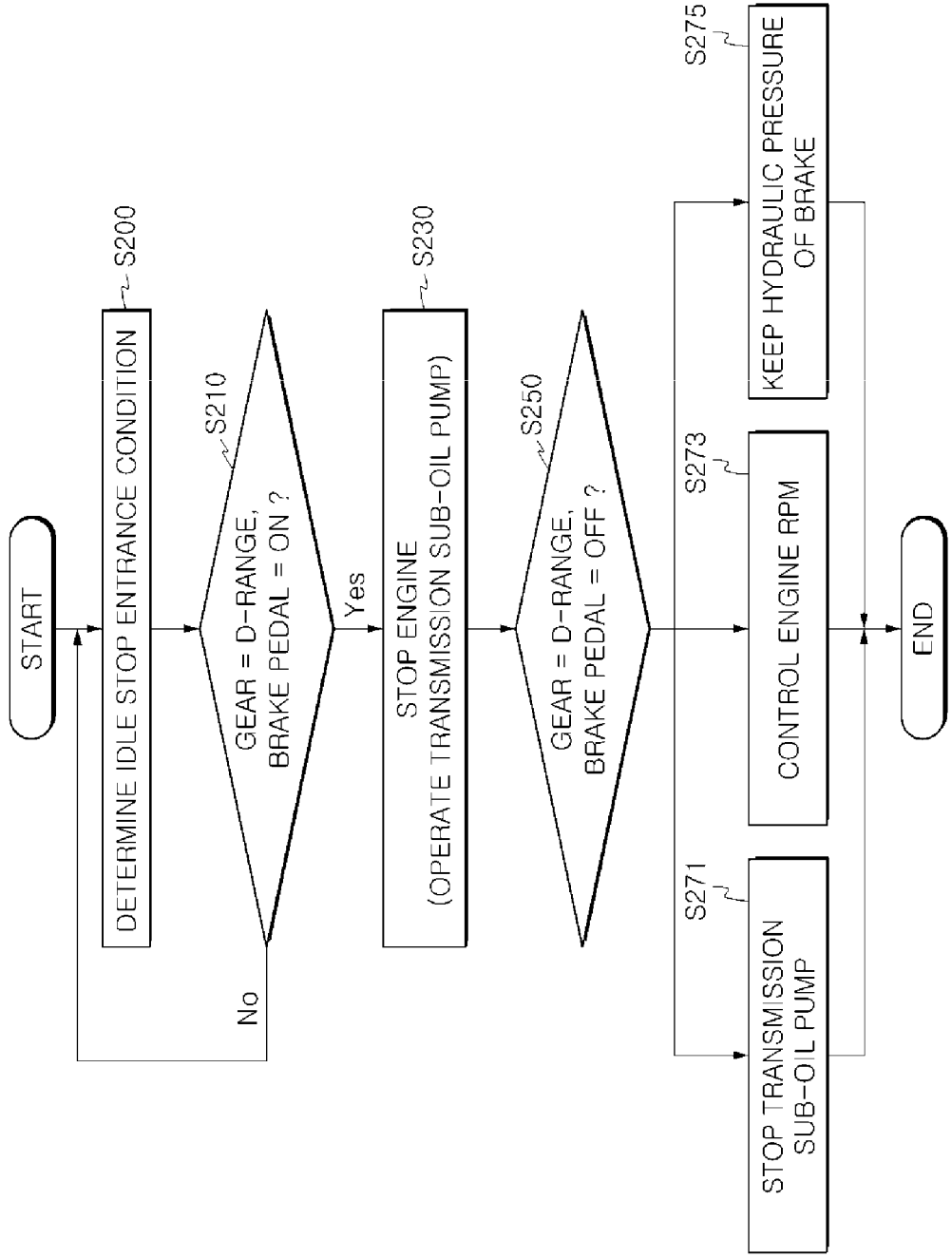

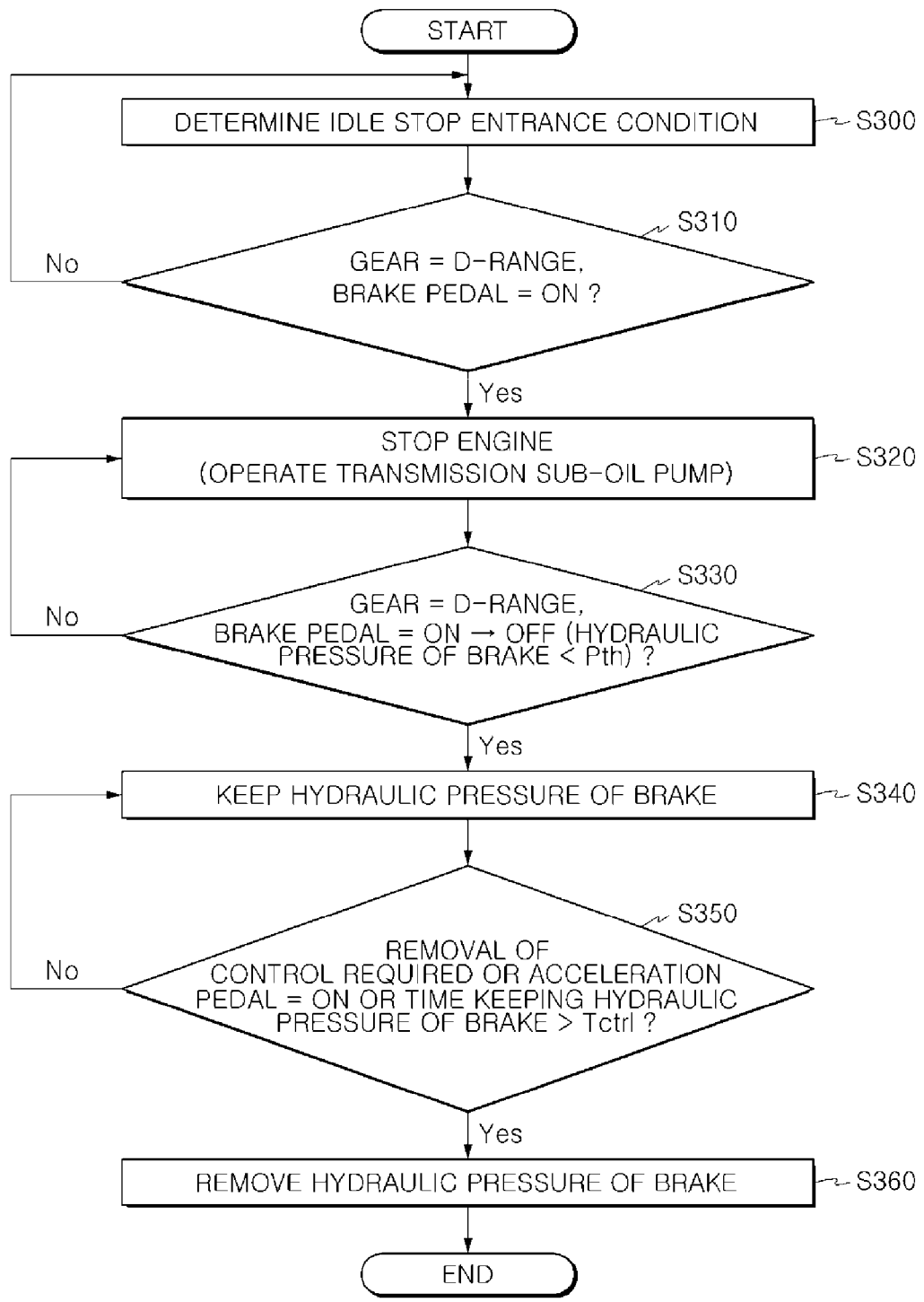

US 8,858,396 B2

DEVICE AND METHOD FOR CONTROLLING ISG LOGIC

CROSS-REFERENCE TO RELATED APPLICATIONS

The present application claims priority to Korean Patent Application Number 10-2010-0124551 filed Dec. 7, 2010, the entire contents of which application is incorporated herein for all purposes by this reference.

BACKGROUND OF INVENTION

1. Field of Invention

The present invention relates to a device and a method for controlling ISG logic, and more particularly, to a method of controlling ISG (Idle Stop & Go) logic of an ISG vehicle which automatically stops the engine in idling when the vehicle stops, and restarts the engine after a predetermined time to restart the vehicle.

2. Description of Related Art

The gases causing the greenhouse effect of the various gases in the atmosphere are called greenhouse gases. As the greenhouse gases, there are carbon dioxide, methane, nitrous oxide, Freon gas, and ozone. Although vapor is the most responsible for causing the natural greenhouse effect, a representative greenhouse gas causing global warming is carbon dioxide.

Since the latter half of $20^{th}$ century, global warming has rapidly progressed, unusual weather such that localized heavy rain, drought, typhoon etc. has been rapidly increased. If the present level of contamination continues, it is expected that the greenhouse gas emissions throughout the world will reach a level that seriously threatens mankind and the ecosystem in the sooner future.

Therefore, international cooperation for reducing the exhaust amount of the greenhouse gases has been established to cope with global warming due to the greenhouse gases.

Various efforts have been made to reduce the greenhouse gases in the transportation field, and as a part of the efforts, a great deal of effort is made in improving fuel efficiency.

At the present time where the fuel efficiency is a central theme, use of an ISG (Idle Stop & Go) system is increasing over the world.

The ISG system gives an order to stop an engine in idling, on the basis of information on vehicle speed, the revolution speed of an engine, and the temperature of cooling water etc.

In other words, the ISG system is an engine control system that is provided with a function that automatically stops the idling engine when a vehicle stops for waiting the traffic lights in a town, and restarts (goes) the engine when starting the vehicle after a predetermined time to make normal operation possible.

The ISG system is also called an idling stop control device. The ISG system can achieve fuel effect of about 5~15% in the actual fuel efficiency mode.

A vehicle equipped with the ISG system is called an ISG vehicle. Although the highest prior object of the ISG is to improve the fuel efficiency, forbidden conditions may be set by inclination conditions and battery conditions in order to improve safety and commercial value of the vehicle system.

Referring to FIG. 1, FIG. 1 is a flowchart illustrating a general process of idle stop & go of an ISG vehicle equipped with an automatic transmission.

A common ISG vehicle with an automatic transmission should be equipped with a transmission sub-oil pump to implement the ISG system and the transmission sub-oil pump is used to keep the hydraulic pressure of the transmission when the engine stops.

In the vehicle provided with the ISG system by being equipped with the transmission sub-oil pump, the engine is stopped (S130), when the brake pedal is pressed down to stop the vehicle at the D-range ("Yes" in S110) while an idle stop entrance condition is determined (S100). In this process, the sub-oil pump operates to keep the hydraulic pressure of the transmission.

That is, the condition for stopping the engine by the ISG system is that the vehicle stops with the vehicle speed not detected, the gear is held at the D-range, and the brake pedal is operated and kept at a predetermined time, in which the engine is stopped to increase the fuel efficiency.

Thereafter, when the brake pedal is released at the D-range, with the vehicle stopped ("Yes" in S150), the engine is automatically restarted (S170). In this state, the transmission sub-oil pump is turned off.

That is, with the engine stopped by the ISG system, when the user's intention of starting the vehicle, such as releasing the brake pedal and operating the acceleration pedal, is detected, the engine is turned on to maintain normal traveling.

In the ISG vehicle equipped with an automatic transmission, when the brake pedal is pressed down while the vehicle travels, with the gear at the D-range, the engine stops, and when the brake pedal is released at the D-range, the engine is automatically restarted.

Unlike the engine is restarted at the P-range or the N-range in the related art, since the engine is started, with the driving system and the power system connected, engine increase RPM overshoot is transmitted to the driving system with the restart, the vehicle moves forward.

That is, referring to FIGS. 2 and 3, FIG. 2 is a diagram showing when the engine is restarted at the P-range or the N-range and FIG. 3 is a diagram showing when the engine is restarted at the D-range.

As shown in FIG. 2, when the engine is restarted at the P-range or the N-range in the related art, since the driving system and the power system are not connected, although the vehicle body is vibrated when the engine is restarted, as shown in FIG. 3, when the engine is restarted at the D-range, engine RPM increase torque is transmitted to the driving system when the engine is restarted, starting acceleration is generated and the vehicle moves forward.

Such a problem should be removed in developing an ISG vehicle equipped with an automatic transmission.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to ensure starting performance when an ISG vehicle is restarted after idle-stopping.

Further, various aspects of the present invention have been made in an effort to ensure stable start of an ISG vehicle.

Various aspects of the present invention provide for a device for controlling ISG logic mounted in a vehicle equipped with an ISG system, which comprises a transmitting unit that shows the current state of a gear in the vehicle and controls the hydraulic pressure of a transmission in idle stop or restarting an engine, a driving unit that performs the idle stop when the pedal of a brake becomes ON, with the gear at a D (Drive)-range, and restarts the engine when the pedal of the brake becomes OFF, with the gear of the vehicle at the D-range, and a brake unit that controls movement of the vehicle by controlling the hydraulic pressure of the brake, in which the transmitting unit controls a transmission oil-sub pump to keep the hydraulic pressure of the transmission in the idle stop.

The transmitting unit may control the transmission oil sub-pump such that the hydraulic pressure increases in predetermined proportion from when the idle stop starts.

The transmitting unit may control the transmission oil sub-pump such that hydraulic pressure is supplied from when the hydraulic pressure of the transmission becomes smaller than a predetermined value in the idle stop.

The driving unit may control a difference between overshoot peak RPM of the engine and D-range creep RPM not to exceed 200 RPM in restarting the engine.

Other aspects of the present invention provide for a device for controlling ISG (Idle Stop & Go) logic mounted in a vehicle equipped with an ISG system, the device including a transmitting unit that shows the current state of a gear in the vehicle and controls the hydraulic pressure of a transmission in idle stop or restarting an engine, a driving unit that performs the idle stop when the pedal of a brake becomes ON, with the gear at a D (Drive)-range, and restarts the engine when the pedal of the brake becomes OFF, with the gear of the vehicle at the D-range, and a brake unit that controls movement of the vehicle by controlling the hydraulic pressure of the brake, in which the brake unit controls the hydraulic pressure of a brake to be kept for a predetermined time from when the pedal of the brake becomes OFF.

The transmitting unit may control the transmission oil sub-pump such that the hydraulic pressure increases in predetermined proportion from when the idle stop starts.

The transmitting unit may control the transmission oil sub-pump such that hydraulic pressure is supplied from when the hydraulic pressure of the transmission becomes smaller than a predetermined value in the idle stop.

The driving unit may control a difference between overshoot peak RPM of the engine and D-range creep RPM not to exceed 200 RPM in restarting the engine.

Yet another aspects of the present invention provide for a method of controlling ISG logic, the method including (a) determining whether a brake pedal becomes ON while an ISG vehicle travels with a gear at a D (Drive)-range, (b) performing idle stop and operating a transmission oil sub-pump, when the brake pedal becomes ON in the step (a), (c) determining whether the brake pedal becomes OFF, with the gear at the D-range, and (d) restarting the engine and stopping the transmission oil sub-pump when the brake pedal becomes OFF in the step (c), and controlling the hydraulic pressure to be kept for a predetermined time from when the brake pedal becomes OFF.

The method may further include controlling a difference between overshoot peak RPM of the engine and D-range creep RPM not to exceed 200 RPM in restarting the engine.

The step (b) may control the transmission oil sub-pump such that the hydraulic pressure increases in predetermined proportion from when the idle stop starts.

The step (b) may control the transmission oil sub-pump such that hydraulic pressure is supplied from when the hydraulic pressure of the transmission becomes smaller than a predetermined value in the idle stop.

According to various aspects of the present invention, it is possible to ensure starting performance when the engine is restarted after idle stop, by controlling the hydraulic pressure of a transmission to be kept even in the idle stop of an ISG vehicle.

Further, according to various aspects of the present invention, it is possible to ensure stable start of an ISG vehicle by controlling the engine RPM and the hydraulic pressure of a brake when the ISG vehicle is restarted after idle stop.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a graph showing when a vehicle equipped with an automatic transmission is restarted at the D-range.

FIG. 4 is a block diagram illustrating the configuration of an exemplary device for controlling ISG logic according to the present invention.

FIG. 5 is a graph illustrating an exemplary method of controlling the hydraulic pressure of a transmission in an ISG vehicle.

FIG. 6 is a graph illustrating an exemplary method of controlling the hydraulic pressure of a brake in an ISG vehicle.

FIG. 7 is a flowchart illustrating an exemplary method of controlling ISG logic according to the present invention.

FIG. 8 is a flowchart illustrating in detail an exemplary method of controlling the hydraulic pressure of a brake, in the method of controlling ISG logic of FIG. 7.

Figure 1:
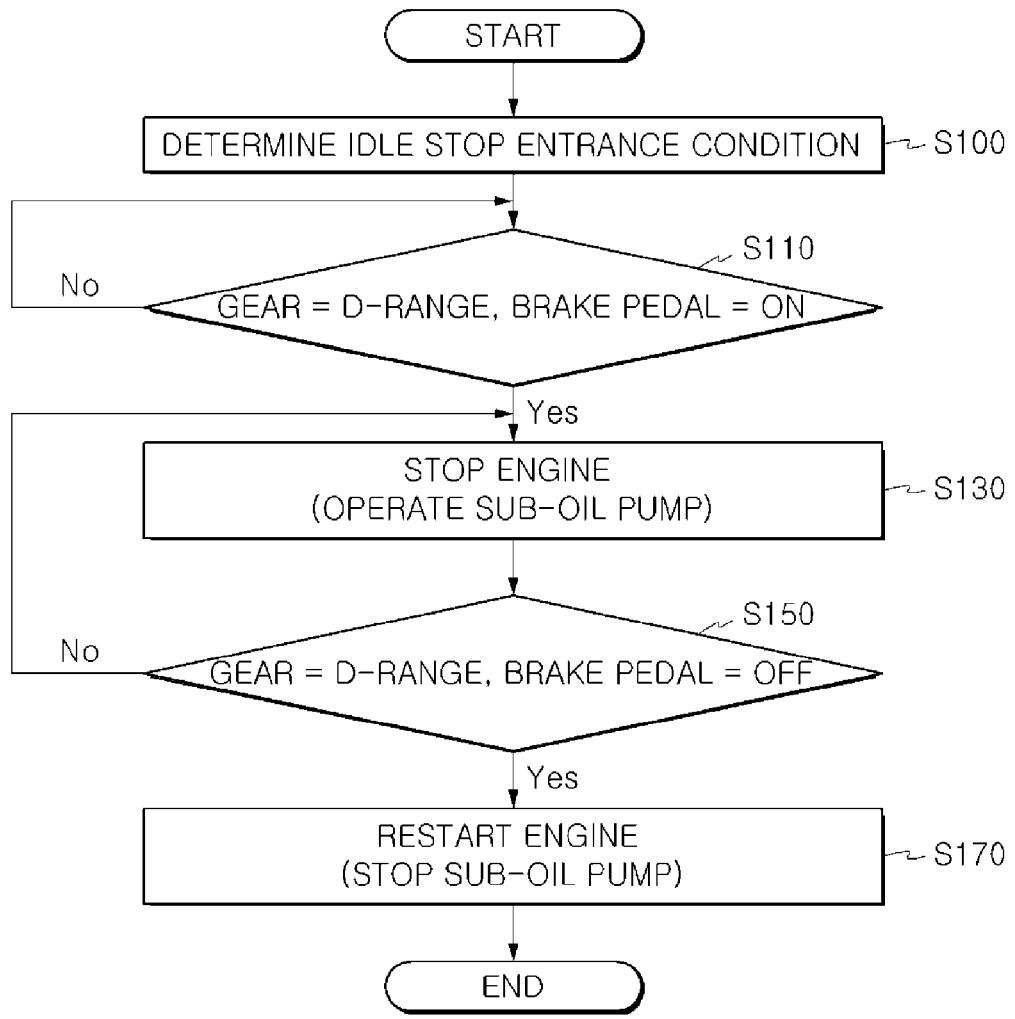
FIG. 1 is a flowchart illustrating a general process of idle stop & go of a vehicle equipped with an automatic transmission.
Figure 2:
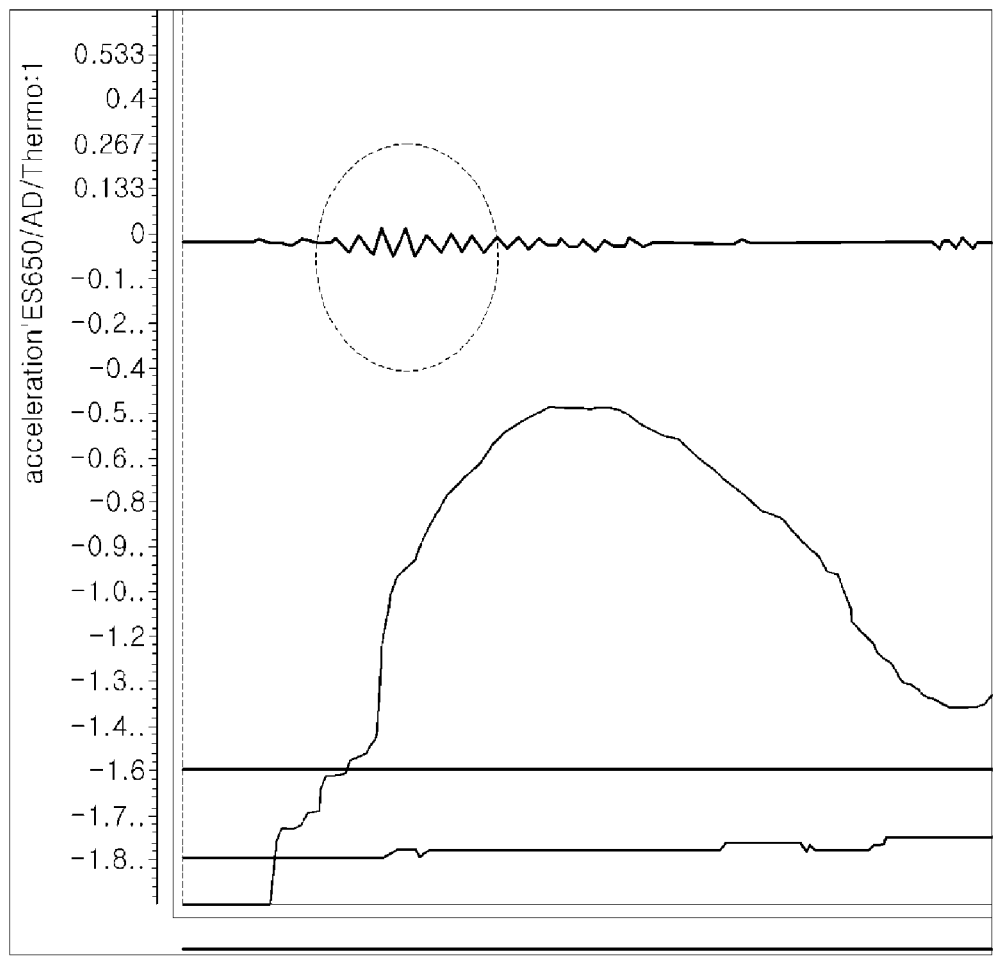
FIG. 2 is a graph showing when an engine is restarted at the P-range or the N-range in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a device for controlling ISG logic according to various embodiments of the present invention is described in detail with reference to FIG. 4.

FIG. 4 is a block diagram illustrating the configuration of a device for controlling ISG logic according to various embodiments of the present invention.

A device for controlling ISG logic 100 according to various embodiments of the present invention includes a transmitting unit 110 including a transmission oil sub-pump 115, a driving unit 130 including an engine 135, and a brake unit 150 including a brake 155.

It is assumed that the vehicle described hereafter is a vehicle equipped with an ISG system. For example, it is assumed that the vehicle is provided with a button for operating the ISG logic on the instrument panel in front of the driver's seat, such that the ISG logic operates when the button is pushed, or even if there is not the button, when the vehicle stops, the ISG logic is automatically operated after a predetermined time.

The vehicle speed should be "0 (zero)" and the acceleration pedal should not be pressed in order to automatically stop an engine 135, that is, perform idle stop while an ISG vehicle traveling stops to wait traffic lights. Further, there is a prior condition that the temperature of the transmission oil should be in a predetermined range and the engine RPM should be under a predetermined value.

In this state, when the driver presses down the pedal of a brake 155, with the gear at the D state in the vehicle, that is, when the pedal of brake 155 becomes ON, the idle stop is performed.

Transmitting unit 110 shows the current state of the gear stage of the ISG vehicle and controls the hydraulic pressure of a transmission in idle stopping or restarting.

Driving unit 130 performs the idle stop, when the brake pedal becomes ON, with the gear at the D (Drive) state, and restarts the stopped engine, when the brake pedal becomes OFF, with the gear of the vehicle at the D state.

Brake unit 150 controls the movement of the vehicle by controlling the hydraulic pressure of brake 155.

Transmitting unit 110 controls transmission oil-sub pump 115 to keep the hydraulic pressure in the idle stop, that is, it operates transmission oil sub-pump 115 with two mechanisms to keep the hydraulic pressure for the D-range in the idle stop.

Referring to FIG. 5, FIG. 5 is a graph illustrating a method of controlling the hydraulic pressure of a transmission in an ISG vehicle.

The first mechanism (the curve (a) in FIG. 5) operating transmission oil sub-pump 115 is to operate transmission oil sub-pump 115 by increasing the hydraulic pressure in predetermined proportion in consideration of the reduction speed of the hydraulic pressure of the transmission from the start of the idle stop such that the hydraulic pressure reaches a predetermined hydraulic pressure of the transmission, thereby keeping the hydraulic pressure of the transmission. The predetermined hydraulic pressure of the transmission may be set at the hydraulic pressure of the transmission at the start of the idle stop.

The second mechanism (the curve (b) in FIG. 5) operating transmission oil sub-pump 115 is to control transmission oil sub-pump 115 such that hydraulic pressure is supplied when the hydraulic pressure of the transmission starts to become smaller than the predetermined value in the idle stop.

That is, the hydraulic pressure is kept by setting a specific value at the point, where the curve showing the hydraulic pressure of the transmission decreases in FIG. 5, as the value operating transmission oil sub-pump 115, and operating transmission oil sub-pump 115 when the hydraulic pressure curve of the transmission reaches the specific value.

Accordingly, it is possible to decrease the current consumed by transmission oil sub-pump 115.

Further, when the driver gets the foot off the pedal of brake 155, with the gear at the D-range, that is, when the pedal of brake 155 becomes OFF, transmitting unit 110 stops the operation of transmission oil sub-pump 115, in which transmission oil sub-pump 115 may be controlled to stop the operation, when the engine RPM is above a predetermined value.

Driving unit 130 controls a difference between overshoot peak RPM of the engine and D-range creep RPM not to exceed 200 RPM in restarting the engine. That is, in restarting the engine after the idle stop, the overshoot peak RPM of the engine is controlled at a level close to the D-range creep RPM, different from the Key-starting, and the time taken to finish starting the engine is minimized.

In order to reduce the overshoot peak RPM of the engine, for example, the control is performed by tuning, such as reducing the amount of air, advancing the injection timing, reducing the amount of injected fuel, and advancing the ignition timing.

Brake unit 150 keeps the hydraulic pressure of brake 155 for a predetermined time after the pedal of brake 155 becomes OFF.

Referring to FIG. 6, FIG. 6 is a graph illustrating a method of controlling the hydraulic pressure of brake 155 in an ISG vehicle.

That is, brake unit 150 controls the hydraulic pressure of the brake such that the hydraulic pressure of the brake is kept for a predetermined time, from when the driver starts to get the foot off brake 155 to when the driver completely gets the foot off, in the idle stop. The predetermined time may be set in consideration of various situations and may be set to an average time that the driver gets off the foot from the brake, for example, 1 second.

Accordingly, it is possible to prevent the vehicle from moving forward right after being restarted.

Hereinafter, a method for controlling ISG logic according to various embodiments of the present invention is described in detail with reference to FIG. 7.

Referring to FIG. 7, an idle stop entrance condition is determined first (S200) for an ISG vehicle, and when the brake pedal is pressed down and the ISG vehicle that travels is stopped with the gear at the D-range, that is, when the brake pedal becomes ON (S210), idle stop is performed.

Accordingly, the engine stops and the hydraulic pressure for the D-range is kept in the idle stop by operating transmission oil sub-pump (S230), in which two mechanisms operating the transmission oil sub-pump were described above, such that repeated description is not provided.

Next, when the driver gets the foot off the brake pedal, with the gear at the D-range, that is, when the brake pedal becomes OFF (S250), the engine is restarted, in which the operation of the transmission oil-sub pump is stopped (S271), the engine RPM is controlled (S273), and the hydraulic pressure of the brake is controlled to be kept (S275).

In controlling the engine RPM (S273), the difference between the overshoot peak RPM of the engine and the D-range creep RPM is controlled not to exceed 200 RPM, in restarting the engine. That is, in restarting the engine after the idle stop, the overshoot peak RPM of the engine is controlled at a level close to the D-range creep RPM, different from the Key-starting, and the time taken to finish starting the engine is minimized.

In order to reduce the overshoot peak RPM of the engine, for example, the control is performed by tuning, such as reducing the amount of air, advancing the injection timing, reducing the amount of injected fuel, and advancing the ignition timing.

Further, controlling the hydraulic pressure of the brake to be kept (S275) is described in more detail with reference to FIG. 8.

The steps S300 to S320 in FIG. 8 correspond to the steps S200 to S230 in FIG. 7, and thus repeated description is not provided.

After the idle stop (S320), it is determined that the driver is getting the foot off the brake pedal, that is, the brake pedal is becoming OFF from ON, with the gear at the D-range (S330). It is determined whether the hydraulic pressure of the brake reduces down under a threshold hydraulic pressure value Pth (hydraulic pressure of the brake <Pth), and when the hydraulic pressure of the brake reduces down under Pth, it can be determined that the driver has got the foot off the brake.

Therefore, the hydraulic pressure of the brake is controlled to be kept even while the driver gets the foot off the brake pedal, that is, while the brake pedal becomes OFF from ON (on→off) (S340).

Next, when there is a requirement for removing the control for keeping the hydraulic pressure of the brake, the driver presses down the acceleration pedal, or the hydraulic pressure of the brake is kept over a predetermined time Tctrl (S350), the control of hydraulic pressure of the brake is removed (S360). The time Tctrl is set to a time that is generally taken for the driver to get the foot off the brake.

According to the device and the method of controlling ISG logic of the present invention, it is possible to ensure starting performance when the engine is restarted after idle stop, by controlling the hydraulic pressure of a transmission to be kept even in the idle stop of an ISG vehicle.

Further, it is possible to ensure stable start of an ISG vehicle by controlling the engine RPM and the hydraulic pressure of a brake when the ISG vehicle is restarted after idle stop.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for controlling idle stop & go (ISG) logic mounted in a vehicle equipped with an ISG system, the device comprising:
    a transmitting unit that shows a current state of a gear in the vehicle and controls a hydraulic pressure of a transmission in idle stop or restarting an engine;
    a driving unit that performs the idle stop when a pedal of a brake becomes ON, with the gear at a D (Drive)-range, and restarts the engine when the pedal of the brake becomes OFF, with the gear of the vehicle at the D-range; and
    a brake unit that controls movement of the vehicle by controlling a hydraulic pressure of the brake;
    wherein the transmitting unit controls a transmission oil sub-pump to maintain the hydraulic pressure of the transmission in the idle stop,
    the driving unit performs tuning to reduce overshoot peak RPM (revolutions per minute) of the engine when restarting the engine; and
    the tuning includes reducing an amount of air, advancing an injection timing, reducing an amount of injected fuel, and/or advancing an ignition timing.

2. The device as defined in claim 1, wherein the transmitting unit controls the transmission oil sub-pump such that the hydraulic pressure increases in predetermined proportion from when the idle stop starts.

3. The device as defined in claim 1, wherein the transmitting unit controls the transmission oil sub-pump to increase the hydraulic pressure of the transmission when the hydraulic pressure of the transmission becomes smaller than a predetermined value in the idle stop.

4. The device as defined in claim 1, wherein the driving unit controls a difference between the overshoot peak RPM of the engine and D-range creep RPM not to exceed 200 RPM in restarting the engine.

5. A device for controlling idle stop & go (ISG) logic mounted in a vehicle equipped with an ISG system, the device comprising:
    a transmitting unit that shows a current state of a gear in the vehicle and controls a hydraulic pressure of a transmission in idle stop or restarting an engine;
    a driving unit that performs the idle stop when a pedal of a brake becomes ON, with the gear at a D (Drive)-range, and restarts the engine when the pedal of the brake becomes OFF, with the gear of the vehicle at the D-range; and
    a brake unit that controls movement of the vehicle by controlling a hydraulic pressure of the brake;
    wherein the brake unit controls the hydraulic pressure of the brake to be kept for a predetermined time from when the pedal of the brake becomes OFF;
    the driving unit performs tuning to reduce overshoot peak RPM of the engine when restarting the engine; and
    the tuning includes reducing an amount of air, advancing an injection timing, reducing an amount of injected fuel, and/or advancing an ignition timing.

6. The device as defined in claim 5, wherein the transmitting unit controls a transmission oil sub-pump such that the hydraulic pressure increases in predetermined proportion from when the idle stop starts.

7. The device as defined in claim 5, wherein the transmitting unit controls the transmission oil sub-pump to increase the hydraulic pressure of the transmission when the hydraulic pressure of the transmission becomes smaller than a predetermined value in the idle stop.

8. The device as defined in claim 5, wherein the driving unit controls a difference between the overshoot peak RPM of the engine and D-range creep RPM not to exceed 200 RPM in restarting the engine.

9. A method of controlling idle stop & go (ISG) logic, the method comprising:
    (a) determining whether a brake pedal becomes ON while an ISG vehicle travels with a gear at a D (Drive)-range;
    (b) performing idle stop and operating a transmission oil sub-pump, when the brake pedal becomes ON in the step (a);
    (c) determining whether the brake pedal becomes OFF, with the gear at the D-range; and (d) restarting the engine and stopping the transmission oil sub-pump when the brake pedal becomes OFF in the step (c), and controlling a hydraulic pressure to be kept for a predetermined time from when the brake pedal becomes OFF;

wherein in the step (d) of restarting the engine, tuning is performed to reduce overshoot peak RPM of the engine, and the tuning includes reducing an amount of air, advancing an injection timing, reducing an amount of injected fuel, and/or advancing an ignition timing.

10. The method as defined in claim 9, wherein the step (b) controls the transmission oil sub-pump such that the hydraulic pressure increases in predetermined proportion from when the idle stop starts.

11. The method as defined in claim 9, wherein the step (b) controls the transmission oil sub-pump to increase the hydraulic pressure of the transmission when the hydraulic pressure of the transmission becomes smaller than a predetermined value in the idle stop.

* * * * *